(12) United States Patent
Mian

(10) Patent No.: US 11,977,160 B2
(45) Date of Patent: May 7, 2024

(54) OVERHEIGHT AND WIDE LOAD DETECTION SYSTEM AND METHOD THEREOF

(71) Applicant: Zahid F. Mian, Loudonville, NY (US)

(72) Inventor: Zahid F. Mian, Loudonville, NY (US)

( * ) Notice: Subject to any disclaimer, the term of this patent is extended or adjusted under 35 U.S.C. 154(b) by 389 days.

(21) Appl. No.: 17/208,203

(22) Filed: Mar. 22, 2021

(65) Prior Publication Data

US 2021/0302580 A1    Sep. 30, 2021

Related U.S. Application Data

(60) Provisional application No. 62/993,863, filed on Mar. 24, 2020.

(51) Int. Cl.
| | |
|---|---|
| *G01S 17/88* | (2006.01) |
| *G01B 11/06* | (2006.01) |
| *G01P 3/00* | (2006.01) |
| *G01S 17/08* | (2006.01) |
| *G08B 21/18* | (2006.01) |

(52) U.S. Cl.
CPC .......... *G01S 17/88* (2013.01); *G01B 11/0608* (2013.01); *G01P 3/00* (2013.01); *G01S 17/08* (2013.01); *G08B 21/182* (2013.01)

(58) Field of Classification Search
CPC ..... G01S 17/88; G01S 17/08; G01B 11/0608; G01P 3/00; G01P 13/183; G01P 13/045; G01P 13/182; G08B 21/182
USPC ........................................................ 356/4.01
See application file for complete search history.

(56) References Cited

U.S. PATENT DOCUMENTS 8,478,480 B2 *    7/2013   Mian ...................... G01N 21/88
                                                            348/148

* cited by examiner

*Primary Examiner* — Daniel L Murphy (57) ABSTRACT

A system for detecting an overheight and/or an over-width of a vehicle or a load carried by a vehicle includes a plurality of dimension sensors. The system also includes a controller configured to determine an object passing through the system based on the inputs received from at least one of the sensors, and determines at least one of a vertical continuous presence of the object or a horizontal continuous presence of the object. The controller determines the object as the load carried by the vehicle if at least one of the vertical continuous presence of the object or the horizontal continuous presence of the object is detected and generates an alert when a maximum height of the load is above a height limit and/or the maximum width of the load is above a width limit.

18 Claims, 6 Drawing Sheets

OVERHEIGHT AND WIDE LOAD DETECTION SYSTEM AND METHOD THEREOF

REFERENCE TO PRIOR APPLICATIONS

The current application claims the benefit of U.S. Provisional Application No. 62/993,863, titled "Overheight and wide load detection system", which was filed on 24 Mar. 2020, and which is hereby incorporated by reference.

TECHNICAL FIELD

The present disclosure relates, generally, to an overheight and/or wide vehicle or vehicle load detection system for vehicles, and more particularly relates to an overheight and width detection system for vehicles having time of flight-based sensors.

BACKGROUND

Both commercial vehicles (trucks, etc.) and freight rail vehicles must contend with the issue of height and width of a transported cargo. Various obstacles, both vertically and laterally, may present themselves along a transport route, the most obvious being bridges whose lower extremities present an absolute barrier to passage of any object exceeding the clearance between the road and the lower portion of the bridge. Despite this, there are numerous accidents per year involving commercial vehicle or rail cargoes impacting with bridges.

To address these issues, various warning methods have been attempted for commercial vehicles, including signage, physical barriers such as chains or poles at the minimum clearance (making noise which, hopefully, alerts the driver), and other methods.

Figure 1:
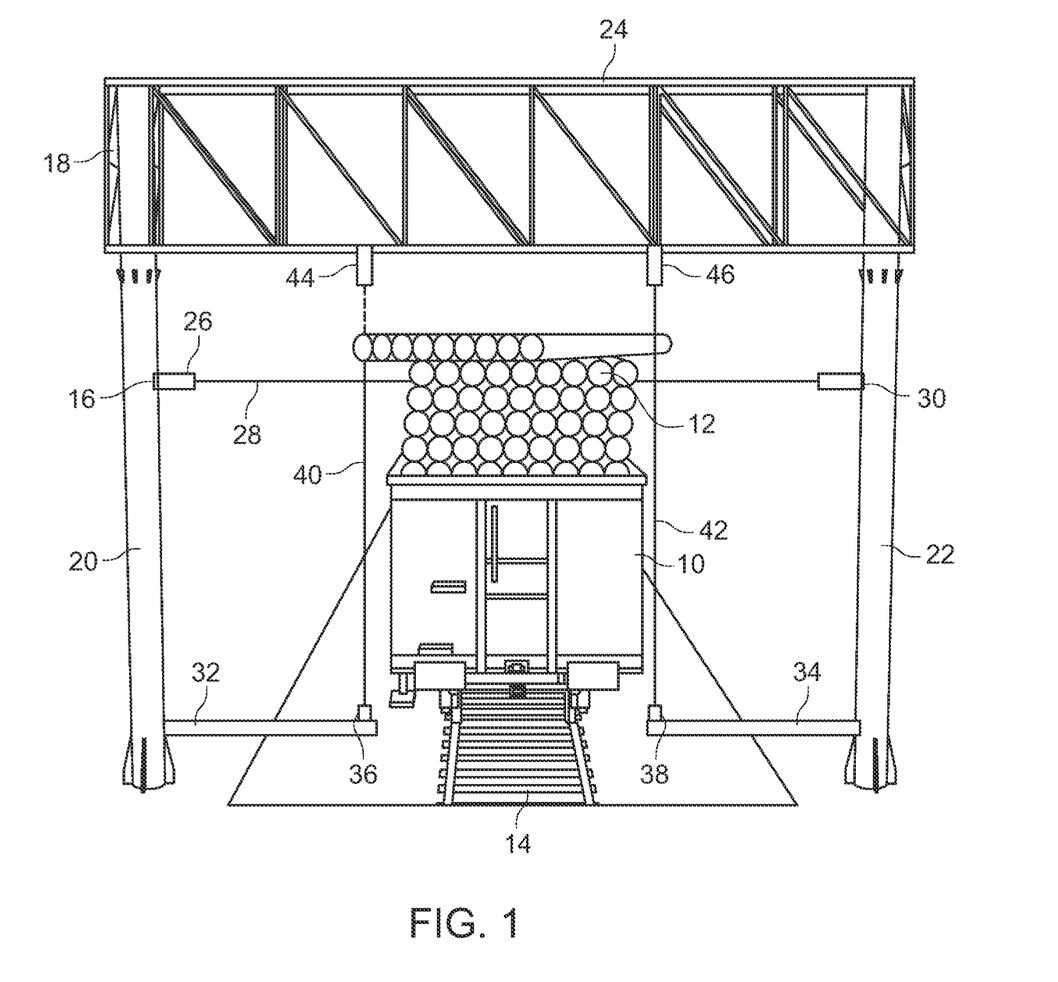
FIG. 1 illustrates a schematic view of a prior art system for detecting an overheight and/or over-width of a load carried by a vehicle.

The most common system and method used is illustrated in FIG. 1. FIG. 1 shows a train car 10 carrying a load 12 and proceeding down a track 14, and a system 16 for detecting a height and a width of the load 16 and generating a waring if the height and/or width of the load 12 exceed height and/or width limitations. The system 16 includes a gantry 18 having two support columns 20, 22 and an overhead gantry arm 24. The gantry 18 is arranged such that the train cars 10 with the load 12 may pass safely through the gantry 18 even if the height and/or width of the load 12 is substantially higher and/or wider than expected. The system 16 includes a light source 26 mounted on one column 20 and adapted to project a light beam 28. The light beam 28 may be a collimated beam from a noncoherent source (a standard light source with collimating optics) or a laser beam (coherent light). On the opposing column 22, a photosensitive receiver 30 is present to catch the light beam 28 if nothing interrupts the light beam 28. As long as the light beam 28 from the light source 26 is received by the receiver 30, it is known that no objects over the height limit has been detected. However, if the light beam 28 from the light source 26 is interrupted by the load 12, the light beam 28 cannot travel to the receiver 30. Accordingly, an alert of overheight is triggered when the light beam 28 is not received by the receiver 30.

To detect the load 12 with over-width, the columns 20, 22 is provided with mountings 32, 34 that extends to the width limit. The system 16 also two light sources 36, 38 mounted on the mountings 32, 34 and are therefore arranged on both side of the track 12. The light sources 36, 38 are oriented such that vertical beams 40, 42 of light are produced from the light source 36, 38. Corresponding to each of light sources 36, 38, the system 16 includes an appropriately oriented photosensitive receiver 44, 46 mounted on the gantry arm 22. Again, if one of the vertically directed light beams 40, 42 is interrupted by the load 12, the light cannot travel to the of the receiver 44, 46 and is not detected by the corresponding one of the receivers 44, 46, triggering an over-width alert.

To an extent, this system 16 has shown the ability to detect overheight or over-width loads. However, these systems 16 have also shown considerable shortcomings. For example, a need for a full gantry 18 (both support columns 20, 22 and the gantry arm 24) makes the cost of system 16 to run into several tens of thousands of dollars, depending on exact size, span, and location of the gantry 18. Also, the system 16 can only determine that the beam of light is interrupted and cannot determine what interrupted the light beam or a location of the interruption of the light beam between the light source and receiver. Thus, a bird or a piece of blowing paper can trigger an alert. Also, as the system 16 cannot determine the location of interruption of the light beam, each lane or track must have its own individual gantry to allow accurate detection of overheight and/or over-width issues. While some bridges are effectively of a single height across a lane or track, others present an arched profile. For such bridges, the height limitation varies across the arch. As the current art systems 16 cannot determine where the light beam is broken, they must alert on the lowest possible height limitation, even if it turns out that the load is positioned such that the high point is away from the arch, and would clear the higher portion of the archway.

SUMMARY

In accordance with an embodiment of the present disclosure, a system for detecting an overheight and/or an over-width of a vehicle or a load carried by a vehicle is provided. The system includes a mounting object arranged at a side or above, of a vehicle pathway and a plurality of sensors mounted on the mounting object and arrayed along a length of the mounting object. Each sensor is a time of flight sensor and is oriented to emit a beam. Moreover, each sensor is adapted to receive the beam upon reflection from an object. The system also includes a detector to detect a speed and a direction of motion of the vehicle, and a controller, in communication with the sensors and the detector, is configured to determine an object passing through the system based on the inputs received from one or more of the sensors, and is configured to detect a passage of the vehicle based on the inputs from the detector. The controller is also configured to determine a continuous presence of the object based on the inputs from one or more of the sensors and determines the object as the vehicle or the load carried by the vehicle when the continuous presence is determined. The controller is further configured to determine at least one of a maximum height or a maximum width of the vehicle or the load carried by the vehicle, and generates an alert when the determined maximum height is above a height limit and/or the determined maximum width above a width limit.

In one embodiment, the plurality of sensors includes a plurality of height sensors, each height sensor is adapted to emit a first beam that extends substantially horizontally over the vehicle pathway. Also, the controller is configured to determine a continuous vertical presence of the object based on inputs received from height sensors.

In one embodiment, the plurality of sensors includes a plurality of width sensors, each width sensor is adapted to emit a second beam that extends in substantially vertical direction. The controller is configured to determine a continuous horizontal presence of the object based on inputs received from the width sensors.

In accordance with one embodiment of the present disclosure, a system for detecting an overheight and/or an over-width of a vehicle or the load carried by a vehicle is provided. The system includes an object, such as a pole for example, mounted at a side of a track and having a column portion extending vertically from a ground and a mounting bar arranged substantially horizontally to the ground. The system also includes a plurality of height sensors mounted on the column portion and arrayed along a length of the column portion. Each height sensor is a time of flight sensor and is oriented to emit a first beam, such as a light beam, acoustic, or other signal, that extends substantially horizontally. Further, each height sensor is adapted to receive the first beam upon reflection from an object. The system further includes a plurality of width sensors mounted on the mounting bar and arrayed along a length of the mounting bar. Each width sensor is a time of flight sensor and is oriented to emit a second beam extending substantially vertically. Moreover, each width sensor is adapted to receive the second beam upon reflection from an object. The system furthermore includes a detector to detect a speed and a direction of motion of the vehicle and a controller in communication with the height sensors, the width sensors, and the detector. The controller is configured to determine an object passing through the system based on the inputs received from at least one of the height sensors or the width sensors, and is configured detect a passage of the vehicle based on the inputs from the detector. The controller is also configured to determine at least one of a vertical continuous presence of the object based on the inputs from one or more of the height sensors and/or one or more of the width sensors, or a horizontal continuous presence of the object based on the inputs from one or more of the width sensors and/or or more of the height sensors. Moreover, the controller is configured to determine the object as the load carried by the vehicle if at least one of the vertical continuous presence of the object or the horizontal continuous presence of the object is detected. The controller is also configured to determine at least one of a maximum height or a maximum width of the load carried by the vehicle, and is configured to generate an alert when the maximum height of the load is above a height limit and/or the maximum width of the load is above a width limit.

In one embodiment, the detector is a wheel sensor.

In one embodiment, wherein the controller is configured to determine a direction and a speed of motion of the object, and is configured to compare the direction and the speed of the motion of the object with the speed and the direction of motion of the vehicle. The controller is further configured to determine the object as the load when the direction and the speed of motion of the object corresponds to the direction and the speed of motion of the vehicle.

In one embodiment, controller determines at least one of the maximum height or the maximum width of the load after determining that the direction and the speed of the object corresponds to the direction and the speed of motion of the vehicle.

In one embodiment, the plurality of width sensor includes a plurality of first width sensors arranged on a first side of the track. The system includes a second plurality of width sensors arranged on a second side of the track. Each of second plurality of width sensor is a time of flight sensor.

In one embodiment, the plurality of height sensors is arranged such that one of the plurality of height sensors is arranged at a height from the ground corresponding the height limit of the load, and remaining of the plurality of height sensors are arranged below the height sensor arranged at the height limit.

In one embodiment, the vertical continuous presence of the object is determined based on the inputs from plurality of height sensors.

In one embodiment, the horizontal continuous presence of the object is determined based on the inputs from plurality of width sensors.

In accordance with another embodiment of the present disclosure, a method for detecting an overheight and/or an over-width of a load carried by a vehicle is provided. The method includes detecting, by a controller, an object based on inputs received from at least one of a plurality of height sensors or a plurality of width sensors. Each height sensor is a time of flight sensor and is oriented to emit a first beam that extends substantially horizontally. Also, each height sensor is adapted to receive the first beam upon reflection from the object. Each width sensor is a time of flight sensor and is oriented to emit a second beam extending substantially vertically. Moreover, each width sensor is adapted to receive the second beam upon reflection from the object. The method further includes detecting a passage of the vehicle based on inputs from a detector and determining, by the controller, at least one of a vertical continuous presence of the object based on the inputs from one or more of the height sensors and/or one or more of the width sensors, or a horizontal continuous presence of the object based on the inputs from one or more of the width sensors and/or or more of the height sensors. The method further includes determining the object as the load carried by the vehicle if at least one of the vertical continuous presence of the object or the horizontal continuous presence of the object is detected. Moreover, the method includes determining, by the controller, at least one of a maximum height or a maximum width of the load carried by the vehicle, and generating, by the controller, an alert when the maximum height of the load is above a height limit and/or the maximum width of the load is above a width limit.

In one embodiment, the plurality of height sensors is mounted on a column portion of a pole arranged on a side of the track of the vehicle and is arrayed along a length of the column portion. Also, the plurality of width sensors is mounted on a mounting bar and is arrayed along a length of the mounting bar.

In one embodiment, the detector is configured to detect a speed and a direction of motion of the vehicle.

In one embodiment, the detector is a wheel sensor.

In one embodiment, the method further includes determining, by the controller, a direction and a speed of motion of the object, comparing, by the controller, the direction and the speed of the motion of the object with the direction and the speed of the motion of the vehicle, and determining, by the controller, the object as the load when the direction and the speed of motion of the object corresponds to the direction and the speed of the motion of the vehicle.

In one embodiment, the at least one of the maximum height or the maximum width of the load is determined after determining that the direction and the speed of the object corresponds to the direction and the speed of motion of the vehicle.

In one embodiment, the plurality of width sensor includes a plurality of first width sensors arranged on a first side of the track. A second plurality of width sensors is arranged on a second side of the track. Each of the second plurality of width sensor is a time of flight sensor.

In one embodiment, the plurality of height sensors is arranged such that one of the plurality of height sensors is arranged at a height from the ground corresponding to the height limit of the load, and remaining of the plurality of height sensors are arranged below the height sensor arranged at the height limit.

In one embodiment, the vertical continuous presence of the object is determined based on the inputs from plurality of height sensors.

In one embodiment, the horizontal continuous presence of the object is determined based on the inputs from plurality of width sensors.

In accordance with another embodiment of the present disclosure a method for detecting an overheight and/or an over-width of a vehicle or the load carried by a vehicle is provided. The method includes detecting, by a controller, an object based on inputs received from at least one of a plurality of sensors. Each sensor is a time of flight sensor and is oriented to emit a beam. Moreover, each sensor is adapted to receive the beam upon reflection from the object. The method further includes detecting a passage of the vehicle based on inputs from a detector, and determining, by the controller, a continuous presence of the object based on the inputs from one or more of the sensors. The method also includes determining the object as the vehicle or the load carried by the vehicle when continuous presence of the object is detected, and determining, by the controller, at least one of a maximum height or a maximum width of the vehicle or the load carried by the vehicle. Moreover, the method includes generating, by the controller, an alert when the determined maximum height is above a height limit and/or the determined maximum width is above a width limit.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. The use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 2:
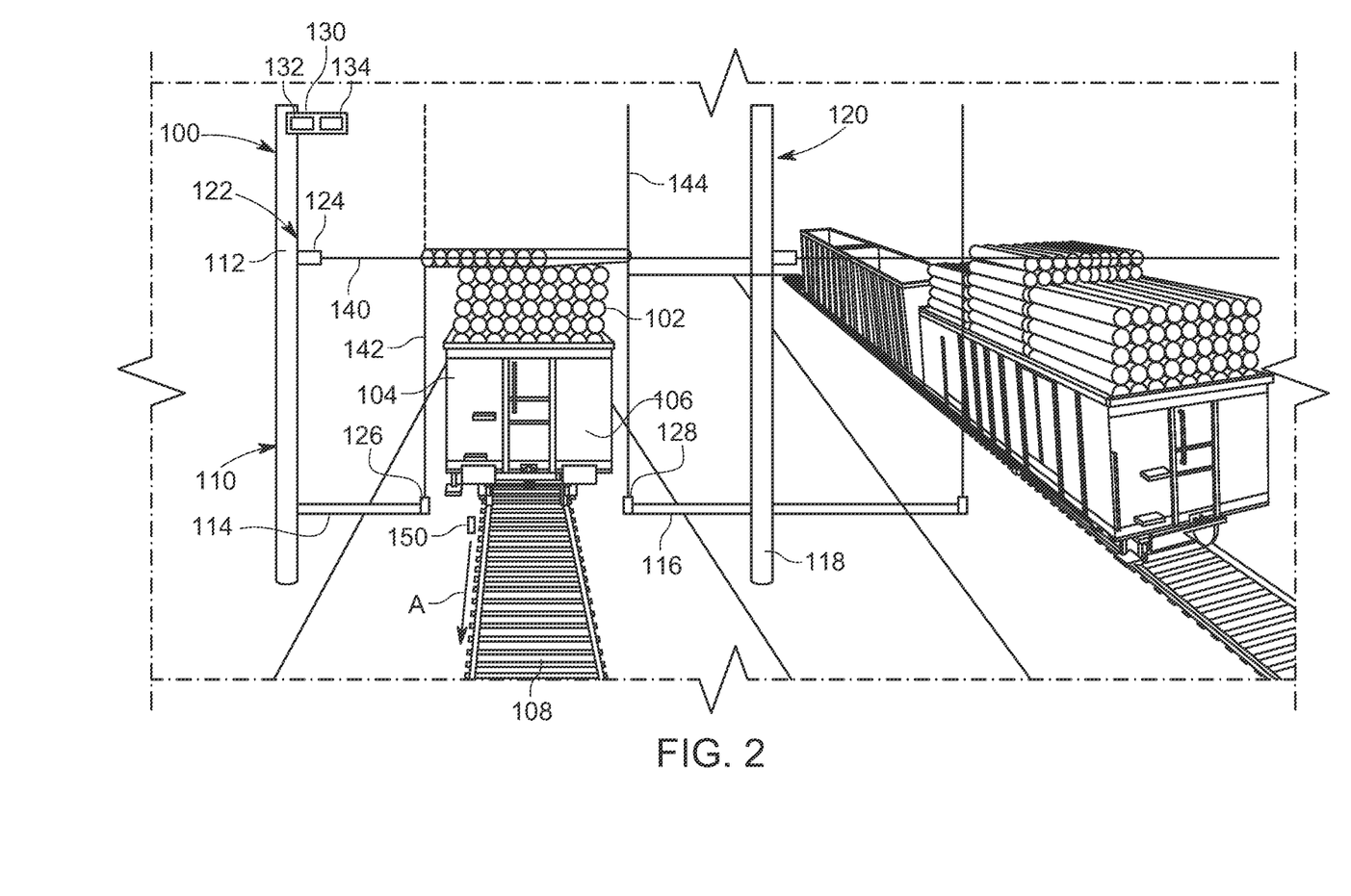
FIG. 2 illustrates a schematic view of a system for detecting an overheight and/or over-width of a load carried by a vehicle.

Referring to FIG. 2, a system 100 for detecting a height and a width of a load 102 transported by a vehicle 104 is shown. The vehicle 104 is shown as a rail car 106 that moves on a rail track 108. Although, the vehicle 104 is shown and contemplated as the rail car 106, it may be envisioned that the vehicle 104 may be a truck, a dump truck, a ship, or any other vehicle suitable for transporting the load 102 from one location to another location. As shown, the system 100 includes a mounting object, for example, first pole 110 mounted on a side of the track 108 (i.e. vehicle pathway 108) and having a first column portion 112 arranged substantially vertically and upwardly from a ground, and a first mounting bar 114 connected to the first column portion 112 and extending in a substantially horizontal direction from the first column portion 112 and towards the track 108. As shown, the first mounting bar 114 is arranged substantially parallel to the ground or the track 108. Additionally, the system 100 includes a second mounting bar 116 arranged opposite side of the track 108 and in line with the first mounting bar 114. As with the first mounting bar 114, the second mounting bar 116 also extends towards the track 108 and is arranged substantially parallel to the ground. The second mounting bar 116 may be connected to a second column portion 118 of a second pole 120 that is arranged substantially parallel to the first pole 100. Although the mounting object is shown to be arranged at a side of the vehicle pathway 108, it may be appreciated that the mounting object or a portion of the mounting object may extend above the vehicle pathway 108 is arranged substantially parallel to a width of the vehicle pathway 108.

Further, the system 100 include a sensing unit 122 having a plurality of sensors, for example, a height sensor 124, a first width sensor 126, a second width sensor 128, and a controller 130 communicatively coupled to the sensing unit 122. The controller 130 is configured to determine/detect overheight and/or over-width of the load 102 carried by the vehicle 104 based on the inputs from the sensors 124, 126, 128. The controller 130 may be capable of processing the information received from the sensing unit 122, and outputting command and control signals to generate alerts.

The controller 130 may include a processor 132 for executing specified instructions to determine the overheight and/or over-width condition of the load 102. The processor 132 may be operatively connected to a memory 134 for storing instructions related to the processing of the signal received from the sensing unit 122. In an embodiment, the memory 132 may also determine a height limit and a width limit depending on a location of the vehicle 104. In some embodiments, the memory 134 may store height limit and width limit corresponding to the location of the system 100.

The memory 134 as illustrated is integrated into the controller 130, but those skilled in the art will understand that the memory 134 may be separate from the controller 130, and/or remote from the controller 130, while still being associated with and accessible by the controller 130 to store information in and retrieve information from the memory 134 as necessary. Although the processor 132 is shown, it is also possible and contemplated to use other electronic components such as a microcontroller, an application specific integrated circuit (ASIC) chip, or any other integrated circuit device. Moreover, the controller 130 may refer collectively to multiple control and processing devices associated with the various sensors of the sensing unit 122. For example, the height sensor 124, the first width sensor 126, and the second width sensor 128 may each have one or more controllers that communicate with the controller 130.

As shown in FIG. 2, the height sensor 124 is mounted on the first column portion 112 and oriented such that the height sensor 124 emits a narrow beam of rays 140 (hereinafter referred to as first beam 140) that is directed in a horizontal direction. The height sensor 124 is arranged at a height 'h' from the ground such that the height 'h' corresponds to a height limit of the load 102 from the ground. The height sensor 124 is a time-of-flight sensor with adequate sensing range, such as those from Banner in their LT7 series, and may use visible light, infrared, visible light, or even other means such as ultrasonics, as long as the height sensor 124 has the requisite range and accuracy. When not blocked by an object or the load 102, the first beam 140 continues until the first beam 140 either strikes a known object that is arranged at a known distance from the height sensor 124 or goes beyond the sensing range of the height sensor. When an object or the load 102 intercepts the first beam 140, the first beam 140 reflects back from the object or the load 102 towards the height sensor 124. The height sensor 124 is adapted to receive/detect the reflected beam. The height sensor 124 or the controller 130 based on the data received from the height sensor 124 determines and record the distance of the object or load 102 from the pole 110, thereby determining the location of the intercepting object or the load 102 with respect to the height sensor 124. The height sensor 124 or the controller 130 determines the distance based on the time difference between the emission of a signal and its return to the height sensor 124, after being reflected by the object or the load 102.

Further, the first width sensor 126 is mounted on the first mounting bar 114 at a location proximate to a free end of the first mounting bar 114 such that a distance between a center of the track and first width sensor 126 corresponds to a width limit. The first width sensor 126 is oriented such that the first width sensor 126 emits a beam 142 (hereinafter referred to as second beam 142) that is oriented in upwardly in a vertical direction. Similarly, the second width sensor 128 is mounted on the second mounting bar 116 at a location proximate to a free end of the second mounting bar 116 such that a distance between a center of the track 108 and the second width sensor 128 corresponds to a width limit. The second width sensor 128 is oriented such that the second width sensor 128 emits a beam 144 (hereinafter referred to as light beam 144) that is oriented in upwardly in a vertical direction. It may be envisioned that a structure and a function of the first width sensor and the second width sensor are identical, and therefore, for the sake of clarity and brevity, the structure and the function of only the first width sensor is explained in detail.

As with the height sensor 124, the first width sensor 126 is a time-of-flight sensor with adequate sensing range, such as those from Banner in their LT7 series, and may use visible light, infrared, visible light, or even other means such as ultrasonics, as long as the first width sensor 126 has the requisite range and accuracy. When not blocked by an object or the load 102, the second beam 142 continues until the second beam 142 either strikes a known object that is arranged at a known distance from the first width sensor 126 or goes beyond the sensing range of the first width sensor 126. When an object or the load 102 intercepts the second beam 142, the second beam 142 reflects back from the object or the load 102 towards the first width sensor 126. The first width sensor 126 is adapted to receive/detect the reflected beam. The first width sensor 126 or the controller 130 based on the data received from the first width sensor 126 determines and record the distance of the object or load 102 from the first mounting bar 114, thereby determining the location of the intercepting object or the load 102 with respect to the first width sensor 126. The first width sensor 126 or the controller 130 determines the distance based on the time difference between the emission of a signal and its return to the first width sensor 126, after being reflected by the object or the load 102.

Figure 3A:
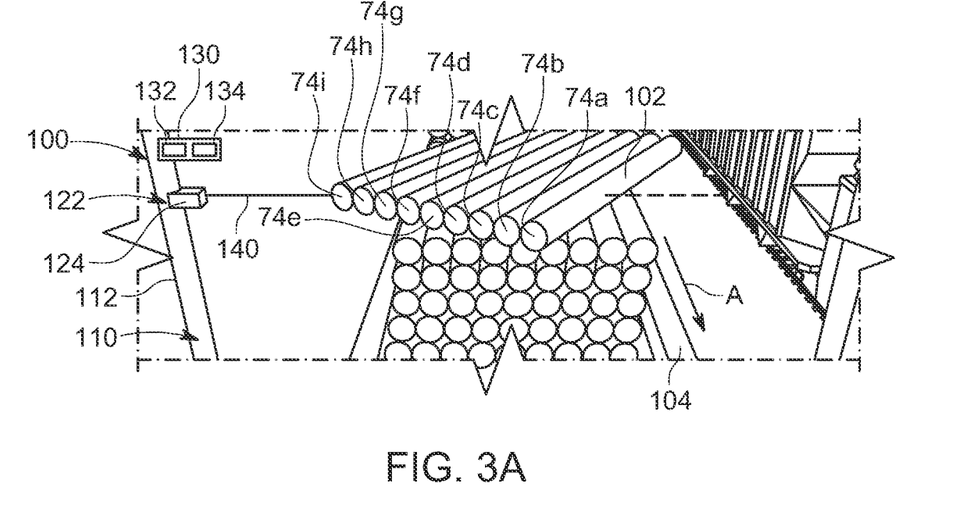
FIG. 3A illustrates a schematic view of the system for detecting an overheight of the load carried by the vehicle depicting various sequential points on the load obstructing a path of a first beam emitted by a height sensor.

An exemplary method for detecting the overheight of the load 102 using the system 100 is explained with reference to FIGS. 3A and 3B. As shown in FIG. 3A, the sensing unit 120 includes only one heigh sensor 124, and hence only emits one first beam 140. As shown, the first beam 140 strikes successively at locations 74*a*, 74*b*, 74*c*, 74*d*, 74*e*, 74*f*, 74*g*, 74*h*, and 74*i* on the load 102 as the rail car 106 travels in a first direction 'A' on the track 108. The first beam 140 is reflected back to the height sensor 124 by the load 102 after striking at each of the successive locations 74a, 74b, 74, c, 74d, 74e, 74f, 74g, 74h, and 74i.

Figure 3B:
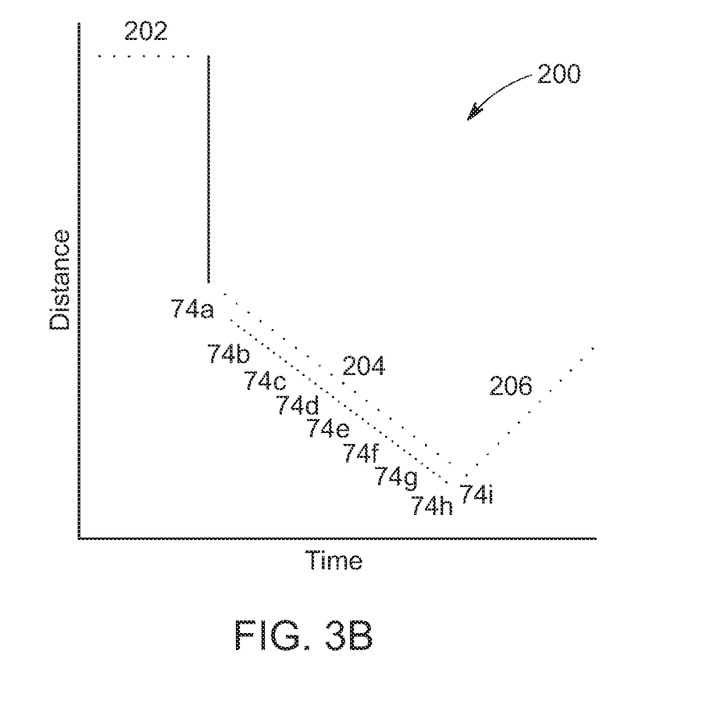
FIG. 3B illustrates a distance vs time graph corresponding to various sequential points on the load obstructing the path of a first light beam emitted by the height sensor.

FIG. 3B shows a graph 200 of distance versus time as detected by the controller 130 in the situation shown in FIG. 3B. Before the load 102 enters the path of the first beam 140, the first beam 140 is unobstructed and continues on its path until it encounters the predefined object, for example, the second pole 120, or goes out of the sensing range. The second pole 120 is thus at the farthest detectable distance from the height sensor 124. As the second pole 120 does not move, the distance is constant, as shown by the graph portion 202.

When the load 102 obstructs the first beam 140 at point 74a, the distance immediately changes to the distance of the point 74a from the height sensor 124. Subsequent points i.e., the points from 74b to 74i obstructing the first beam 140 are progressively nearer to the height sensor 124. Accordingly, a slanted line 204 is produced on the graph 200 or recorded by the controller 130 which is in direct correspondence to the slanted aspect of load 102. As the edge of load 102 is passed and the first beam 140 travels traverses the back side of the load 102, this produces another slanted line 206 which again is in correspondence to the shape of load 102. Similarly, the controller 130 may determine the pattern of distances based on the inputs from the first width sensor 126 and the second width sensor 128.

Based on the pattern of distances received from an object or load 102 moving past the height sensor 124, the controller 130 deduces or determine a shape of the load 102 as well as a location, for example, a height, of the load 102. If combined with some knowledge of the expected types of loads, this shape could provide an additional warning or useful information besides the mere overheight/over-width alert. For example, if it was known that the cargo load 102 was sets of logs, the contours derived from graph 3B would allow the system to recognize that one portion of the load 106 was not only overheight, but had shifted and was not safely fastened down.

The above assumes that the vehicle in question is moving in a known direction past the sensor. However, it is possible for the same signals to be generated by non-vehicle objects. For example, a piece of blowing paper, or a flying bird, moving in the direction of the sensor, would in isolation be indistinguishable from the signature of a diagonal face such as presented by the load 102. Moreover, the exact angle and configuration of the detected load 102 could not be known unless a speed and a direction of motion of the vehicle 104 is known. To address these and to determine the speed and direction of the vehicle 104, the sensing unit 120 includes a detector 150, for example, a wheel sensor 150. The wheel sensor 150 senses the passage, direction, and speed of any rail car 106. Based on the data received from the wheel sensor, the controller 130 determines that the data from the height sensor 124 and the width sensors 126, 128 is due to the load 102 or any other object, such as, a bird or a paper. While a typical wheel sensor 150 is illustrated, it should be obvious that the system 100 could make use of any mechanism or device which would provide the appropriate speed and presence data, including radar, additional beam-break sensors at wheel level, or others.

Figure 4:
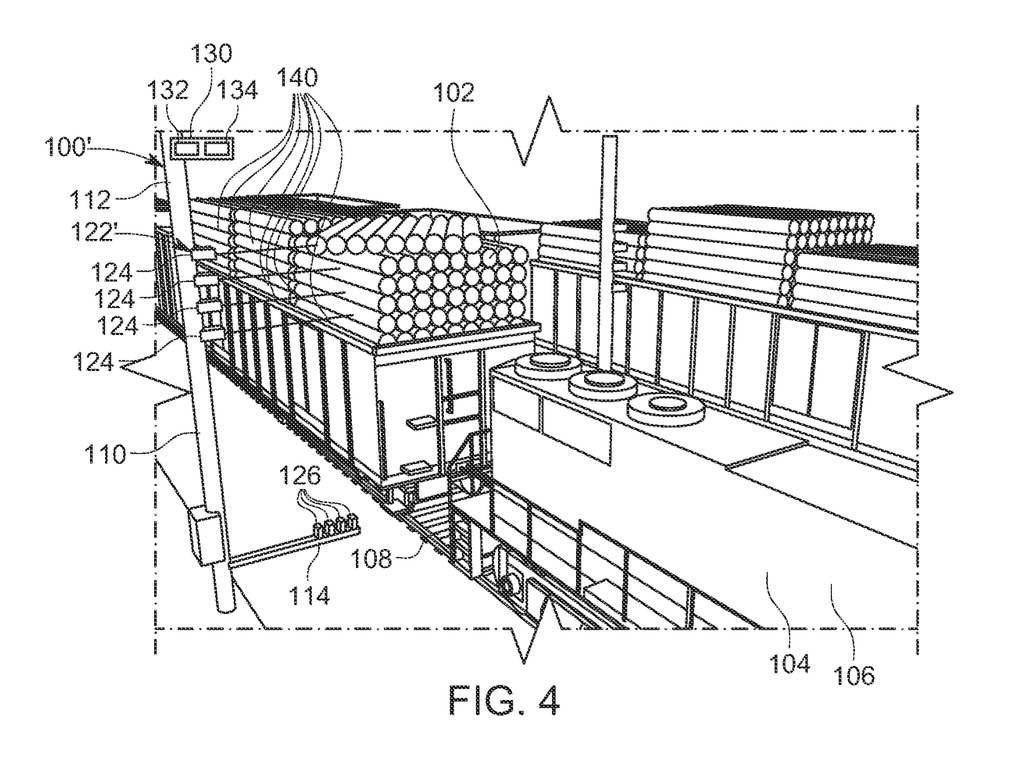
FIG. 4 illustrates a schematic view of a system for detecting an overheight and/or over-width of a load carried by a vehicle.

Referring to FIG. 4, an alternative embodiment of a system 100' is shown. The system 100' is similar to the system 100 except that a sensing unit 122' of the system 100' includes a plurality of sensors, for example, a plurality of height sensors 124 arrayed a length of the first column portion 112 of the first pole 110, a plurality of first width sensors 126 arrayed along a length of the first mounting bar 114 of the first pole 110, and a plurality of second width sensors 128 arrayed along a length of the second mounting bar 116. In an embodiment, the plurality of height sensors 124 are arranged such that a lower most height sensor 124 is arranged at a maximum allowable height of the load 102. In some embodiments, the plurality of height sensors 124 is arranged such that a top-most height sensor 124 is arranged at the maximum allowable height of the load 102. In some implementations, the plurality of height sensors is arranged such that a middle heigh sensor 124 is arranged at the maximum allowable height of the load 102. The plurality of first width sensors 126 and the plurality of second width sensors 128 can similarly be arranged on the first mounting bar 114 and the second mounting bar 116.

It may be appreciated that each of the height sensors 124 simultaneously acquires data on the presence or absence of obstacles along associated range. Thus, false alarms caused by birds or paper can be excluded, as data acquired by the height sensors 124 depicts a continuous vertical presence of the load 102. With knowledge of the speed of the passing vehicle 104, it is possible to also take into account cases in which the overheight object is not of pure vertical extent. Similarly, each of the first width sensors 126 and each of the second width sensors 128 acquire data on the presence of obstacles on the path of the emitted light beams 142, 144. The controller 130 determines a continuous presence of obstacles based on the data received from the sensors 126 and/or the sensors 128.

Figures 5A, 5B, 5C:
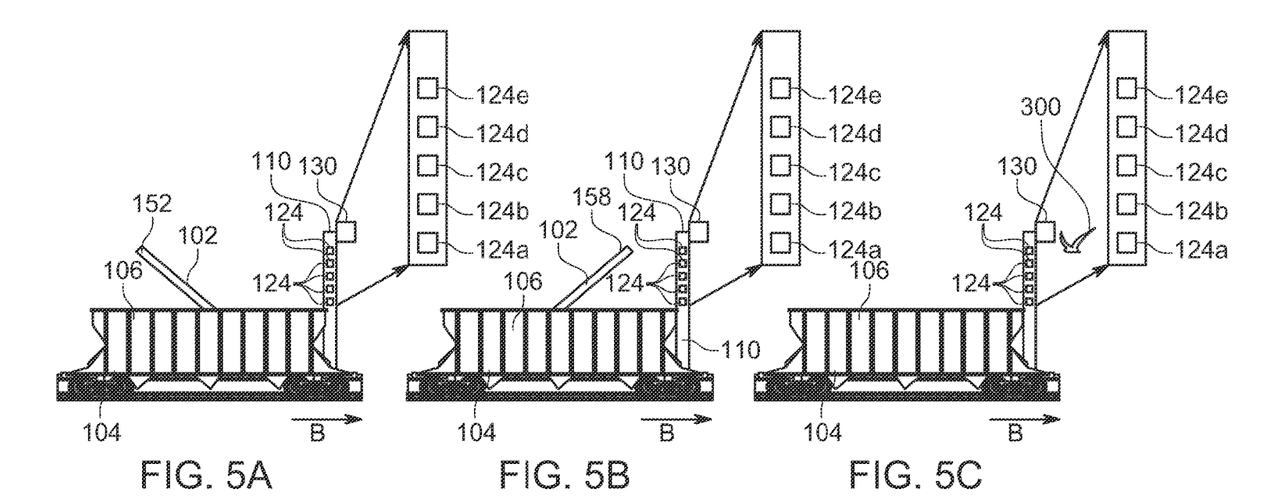
FIG. 5A illustrates an example scenario depicting the load carried by the vehicle and detected by the system of FIG. 4.
FIG. 5B illustrates an example scenario of depicting the load carried by the vehicle and detected by the system of FIG. 4.
FIG. 5C illustrates an example scenario depicting a bird and detected by the system of FIG. 4.

FIG. 5A, FIG. 5B, and FIG. 5C illustrates three exemplary scenarios encountered by the system 100'. In the exemplary scenario shown in FIG. 5A, FIG. 5B, and FIG. 5C, the railcar 106 is traveling down tracks 12, in a direction 'B'. The first pole 110 having the plurality of heigh sensors 12, for example, five height sensors 124a, 124b, 124c, 124d, 124e are arrayed along the height of the first pole 110 are arranged on the side of the track 108.

Figure 6A:
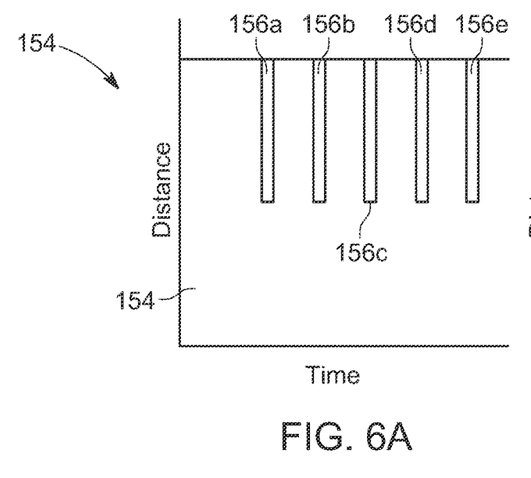
FIG. 6A illustrates a distance vs time graph prepared based on inputs received from a plurality of height sensors of the system of FIG. 4 for example scenario of FIG. 5A.

In the FIG. 5A, the railcar 106 is carrying the load 102 which includes a beam 152 that is inclined to towards a rear of the rail car 106. As the rail car 106 traverses the track 108 in front of the plurality of heigh sensors 124, the height sensors 124a-124e will detect the beam 152 as the portion of the beam 152 that is at the level of the respective sensor 124 passes. This produces a distance-Time graph 154 (shown in FIG. 6A). As the beam 152 is inclined away from the direction of travel, the lower portions of the beam 152 pass the plurality of sensors 124 before the higher portions of the beam 152. As the beam 152 is very narrow, only one sensor 124 is occluded at any given time. However, the sequence of graph traces 156a through 156e for each of the height sensor 124a, 124b, 124c, 124d, 124e respectively shows a progressive and continuous occlusion from low to high, thereby indicating evidence for the detection being a single solid object exceeding the height limit.

Figure 6B:
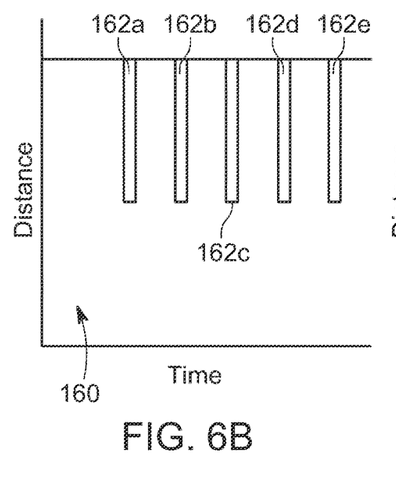
FIG. 6B illustrates a distance vs time graph prepared based on inputs received from a plurality of height sensors of the system of FIG. 4 for example scenario of FIG. 5B.

Similarly, for the second scenario shown in FIG. 5B, the railcar 106 is carrying the load 102 that includes a beam 158 which is inclined towards front of the rail car 105 and in the direction of travel 'B'. Because of this, the higher portions of the beam 158 will be detected first, followed by the lower portions. This produces a graph 160 (as shown in FIG. 6B) whose trace 162a, 162b, 162c, 162d, 162d, 162e with the array of height sensors 124 detecting a target in sequence 124e, 124d, 124c, 124b, 124a. Accordingly, the controller 130 analyzes and determines a detection of a narrow slanted physical load 102 exceeding the height limit.

Figure 6C:
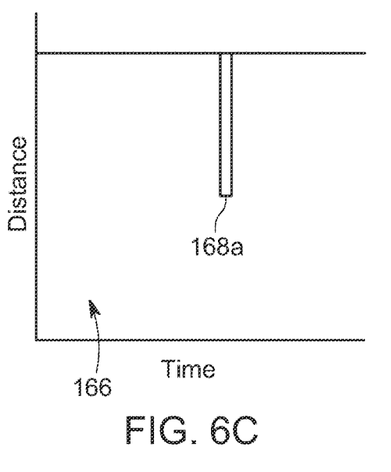
FIG. 6C illustrates a distance vs time graph prepared based on inputs received from a plurality of height sensors of the system of FIG. 4 for example scenario of FIG. 5C.

By contrast, for the third scenario shown in FIG. 5C, the rail car 106 is proceeding down the track 108 in the direction B without the load 102, or at least without any load projecting into the detection area. However, a bird 300 is flying above the track 108 along a path such that the bird 300 will cross in front of one of the sensors 124, for example, the sensor 124e. This results in a graph 166 (shown in FIG. 6C) with a graph trace 168a having a single peak corresponding to the activation of height sensor 124e. Because the entire rail car 106 passes the five sensors 124a-124e without interrupting and reflecting the light beams 140 any of the lower height sensors 124a-124d, the controller 130 determines the object 300 is not a continuous object carried by the rail car 106, and thus does not trigger an alarm associated with overheight alarm.

Similar variations may be used to exclude transient obstructions to the sides of the railcar 106 passing over the plurality of first width sensors 126 and the second width sensors 128.

Figure 7:
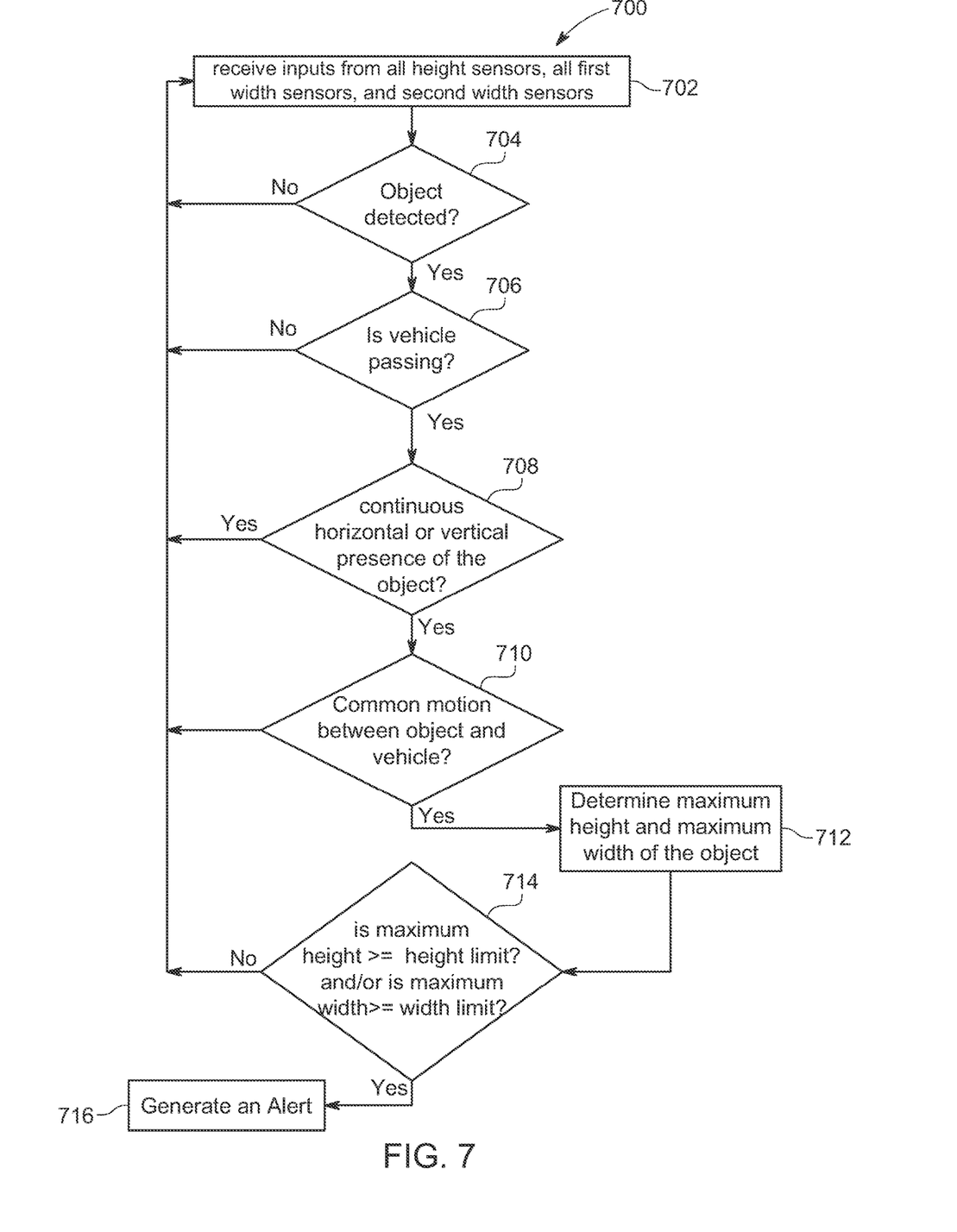
FIG. 7 illustrates a method for detecting an overheight and/or an over-width of the load carried by the vehicle.

Referring to FIG. 7, a method for identifying or detecting or determining a height and/or a width of the load 102 carried by the vehicle 104 using the system 100' is shown. The method includes a step 702 at which the controller receives/acquired inputs from all of the height sensors 124, all of the first width sensors 126, and all of the second width sensors 128. After receiving the inputs from the sensors 124, 126 128, the controller 130, at step 704, determines if an object is detected by any one or more of the sensors 124, 126, 126. For so doing, the controller 130 check if the inputs received from one or more of the sensors 124, 126, 128 is lower than the associated maximum distance reading. The controller detects the objects and moves to a step 706 when the inputs corresponding to one or more of the sensors 124, 126, 128 is lower than the associated maximum distance reading. Further, the method moves back to step 702 when the inputs corresponding to all of the sensors 124, 126, 128 is equal to or above the maximum reading.

At the step 706, the controller 130 determines if the vehicle 106 is passing through the system 100' and corresponding sensing unit 122' based on an input received from the wheel sensor 150. The method 700 moves back to the step 702 if the controller 130 determines that no vehicle is passing through the system 100'. Moreover, the method 700 moves to a step 708 when a passage of the vehicle 104 is determined by the controller 130. At the step 708, the controller 130 determines if there is continuous vertical and/or horizontal presence of the object encountered by the sensors 124, 126, 128 by analyzing the data from all the sensors 124, 126, 128. For example, if the controller has detected lower than maximum reading corresponding to one or more of the height sensors 124, then the controller 130 analyzes the data from all the height sensors 124 to check for any discontinuities between the highest detected object and the lowest detected object, taking into account the direction and speed of motion of the vehicle 104. If there is no continuous presence, the method 700 moves back to 702, else the method moves to a step 710.

At the step 710, the controller 130 checks if there is a common motion between the vehicle 104 and the object detected by the any one or more of the sensors 124 126, 128. The controller 130 may determine the common motion by analyzing the direction and speed of the detected object based on the data received from the sensors 124, 126, 128 and the data received from the wheel sensor 150. The controller 130 may determine the common motion between the object and the vehicle 104 when a speed and a direction of motion of the detected objects corresponds to the direction and speed of the motion of the vehicle 102. The method 700 moves back to the step 702 if the common motion between the detected object and the vehicle 104 is absent. At the step 710, the controller 130 determines that the object is the vehicle 104 or the load 102 carried by the vehicle 104 when the common motion is detected or determined. Thereafter, the method moves to a step 712. In some embodiments, the step 710 may be omitted. In such a case, the controller 130 determines that the object is the vehicle 104 or the load 102 carried by the vehicle 104 when continuous presence of the object is detected at the step 708.

At the step 712, the controller 130 determines a maximum height and/or a maximum width of the vehicle or the load 102 or the object carried by the vehicle 102. Further, at a step 714 of the method 700, the controller 130 compares the determined maximum height to the height limit and the maximum width to the width limit. The method 700 returns to the step 702 if the maximum width and the maximum height do not exceed the limits. The method 700 moves to a step 716 when the maximum height and/or maximum width exceeds the associated limits. At the step 716, the controller 130 generates an alert to an operator of the vehicle 104 and the data is stored in the memory 134.

Although the height sensors 124, the first width sensors 126, and the second width sensors are shown and contemplated as point-source time of flight sensors as the sensors 124, 126, 128 detect the location of a single point on an object passing each of the sensors 124, 126, 128, it may be envisioned that each sensor may be adapted to scan multiple points in a plane extending outwardly of each of the sensors 124, 126, 128. For so doing, the system 100, 100' may include a scanning mechanism that may involve lenses, mirrors, mechanical or solid-state motors or any other suitable mechanism which causes the time-of-flight sensors 124, 126, 128 to scan the location of multiple points of the plane. In some embodiments, a LIDAR based three-dimensional scanning system may also be used.

Further, although the system 100, 100' is shown in conjunction with the rail car 106, it may be appreciated that system 100, 100' may be applied to any land-based vehicle such as, trucks, buses, etc., or to any sea-based vehicle.

Land-based vehicles, of course, may change lanes effectively at will. In these cases, the detector 150 may be a velocity sensor adapted to determine a speed and a direction of travel of the vehicle. As there is no mechanism preventing commercial vehicles from moving sometimes off the edges of the road, the sensors 124, 126, 128 can be scanning sensors to examine the entirety of the land-based vehicle. This may be accomplished by using the sensors 124, 126, 128 with a sufficiently wide field of view to cover the entire vertical extent from the road to the maximum elevation of interest, or using multiple sensors corresponding to each height sensor 124, the first width sensor 126, and the second width sensor 128, whose combine fields of view cover the entire extent.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for detecting an overheight and/or an overwidth of a vehicle or a load carried by a vehicle, the system comprising:
   a mounting object arranged at a side or above, of a vehicle pathway;
   a plurality of sensors mounted on the mounting object and arrayed along a length of the mounting object, wherein each sensor is a time of flight sensor and is oriented to emit a beam, wherein each sensor is adapted to receive the beam upon reflection from an object;
   a detector to detect a speed and a direction of motion of the vehicle; and
   a controller, in communication with the sensors and the detector, is configured to
      determine an object passing through the system based on the inputs received from one or more of the sensors,
      detect a passage of the vehicle based on the inputs from the detector,
      determine a continuous presence of the object based on the inputs from one or more of the sensors,
      determine the object as the vehicle or the load carried by the vehicle when the continuous presence is determined,
      determine at least one of a maximum height or a maximum width of the vehicle or the load carried by the vehicle, and
      generate an alert when the determined maximum height is above a height limit and/or the determined maximum width above a width limit.

2. The system of claim 1, wherein the detector is a wheel sensor.

3. The system of claim 1, wherein the controller is configured to
   determine a direction and a speed of motion of the object,
   compare the direction and the speed of the motion of the object with the speed and the direction of motion of the vehicle, and
   determine the object as the vehicle or the load carried by the vehicle when the direction and the speed of motion of the object corresponds to the direction and the speed of motion of the vehicle.

4. The system of claim 3, wherein the controller determines at least one of the maximum height or the maximum width of the vehicle or the load after determining that the direction and the speed of the object corresponds to the direction and the speed of motion of the vehicle.

5. The system of claim 1, wherein
   the plurality of sensors includes a plurality of height sensors, each height sensor is adapted to emit a first beam that extends substantially horizontally over the vehicle pathway, and
   the controller is configured to determine a continuous vertical presence of the object based on inputs received from height sensors.

6. The system of claim 5, wherein the plurality of height sensors is arranged such that one of the plurality of height sensors is arranged at a height from the ground corresponding to the height limit of the load, and remaining of the plurality of height sensors are arranged below the height sensor arranged at the height limit.

7. The system of claim 1, wherein
   the plurality of sensors includes a plurality of width sensors, each width sensor is adapted to emit a second beam that extends in substantially vertical direction, and
   the controller is configured to determine a continuous horizontal presence of the object based on inputs received from the width sensors.

8. The system of claim 7, wherein the plurality of width sensor includes a plurality of first width sensors arranged on a first side of the vehicle pathway, and the plurality of sensors includes a second plurality of width sensors arranged on a second side of the vehicle pathway, wherein each of the second plurality of width sensor is a time of flight sensor.

9. A method for detecting an overheight and/or an overwidth of a vehicle or the load carried by a vehicle, the method comprising:
   detecting, by a controller, an object based on inputs received from at least one of a plurality of sensors, wherein each sensor is a time of flight sensor and is oriented to emit a beam, and each sensor is adapted to receive the beam upon reflection from the object;
   detecting a passage of the vehicle based on inputs from a detector;
   determining, by the controller, a continuous presence of the object based on the
   inputs from one or more of the sensors;
   determining the object as the vehicle or the load carried by the vehicle when continuous presence of the object is detected;
   determining, by the controller, at least one of a maximum height or a maximum width of the vehicle or the load carried by the vehicle; and
   generating, by the controller, an alert when the determined maximum height is above a height limit and/or the determined maximum width is above a width limit.

10. The method of claim 9, wherein
    the plurality of sensors is mounted a mounting object arranged on a side, or above, of a vehicle pathway and is arrayed along a length of the mounting object.

11. The method of claim 9, wherein the detector is configured to detect a speed and a direction of motion of the vehicle.

12. The method of claim 11, wherein the detector is a wheel sensor.

13. The method of claim 9 further including
    determining, by the controller, a direction and a speed of motion of the object,
    comparing, by the controller, the direction and the speed of the motion of the object with the direction and the speed of the motion of the vehicle, and
    determining, by the controller, the object as the vehicle or the load carried by the vehicle when the direction and the speed of motion of the object corresponds to the direction and the speed of the motion of the vehicle.

14. The method of claim 13, wherein the at least one of the maximum height or the maximum width of the vehicle or the load carried by the vehicle is determined after determining that the direction and the speed of the object corresponds to the direction and the speed of motion of the vehicle.

15. The method of claim 9, wherein
the plurality of sensors includes a plurality of height sensors, each height sensor is adapted to emit a first beam that extends substantially horizontally over the vehicle pathway, and
the controller is configured to determine a continuous vertical presence of the object based on inputs received from height sensors.

16. The method of claim 15, wherein the plurality of height sensors is arranged such that one of the plurality of height sensors is arranged at a height from the ground corresponding to the height limit of the vehicle or the load carried by the vehicle, and remaining of the plurality of height sensors are arranged below the height sensor arranged at the height limit.

17. The method of claim 9, wherein
the plurality of sensors includes a plurality of width sensors, each width sensor is adapted to emit a second beam that extends in substantially vertical direction, and
the controller is configured to determine a continuous horizontal presence of the object based on inputs received from the width sensors.

18. The method of claim 17, wherein the plurality of width sensors includes a plurality of first width sensors arranged on a first side of the vehicle pathway, and a second plurality of width sensors is arranged on a second side of the vehicle pathway, wherein each of the second plurality of width sensor is a time of flight sensor.

\* \* \* \* \*